(12) United States Patent
Tidwell et al.

(10) Patent No.: US 7,760,882 B2
(45) Date of Patent: Jul. 20, 2010

(54) SYSTEMS AND METHODS FOR MUTUAL AUTHENTICATION OF NETWORK NODES

(75) Inventors: Justin Owen Tidwell, Aurora, CO (US); Naohisa Fukuda, Tokyo (JP)

(73) Assignee: Japan Communications, Inc., Tokyo (JP)

( * ) Notice: Subject to any disclaimer, the term of this patent is extended or adjusted under 35 U.S.C. 154(b) by 1176 days.

(21) Appl. No.: 11/154,800

(22) Filed: Jun. 16, 2005

(65) Prior Publication Data

US 2006/0064588 A1    Mar. 23, 2006

Related U.S. Application Data

(60) Provisional application No. 60/583,765, filed on Jun. 28, 2004, provisional application No. 60/598,364, filed on Aug. 3, 2004, provisional application No. 60/652,121, filed on Feb. 11, 2005, provisional application No. 60/653,411, filed on Feb. 16, 2005.

(51) Int. Cl.
*H04K 1/00* (2006.01)
*G06F 7/04* (2006.01)

(52) U.S. Cl. .......................................... 380/270; 726/5
(58) Field of Classification Search .................... 726/5; 380/247, 270
See application file for complete search history.

(56) References Cited

U.S. PATENT DOCUMENTS

| | | | |
|---|---|---|---|
| 5,406,261 | A | 4/1995 | Glenn et al. |
| 5,748,084 | A | 5/1998 | Isikoff |
| 5,936,526 | A | 8/1999 | Klein et al. |
| 5,953,536 | A | 9/1999 | Nowlin |
| 5,958,058 | A | 9/1999 | Barrus |
| 6,070,240 | A | 5/2000 | Xydis |
| 6,198,920 | B1 | 3/2001 | Doviak et al. |
| 6,418,324 | B1 | 7/2002 | Doviak et al. |

(Continued)

FOREIGN PATENT DOCUMENTS

EP    0 849 909    6/1998

(Continued)

OTHER PUBLICATIONS

United States Patent and Trademark Office, Office Action, U.S. Appl. No. 11/467,745, mailed May 30, 2008.

(Continued)

*Primary Examiner*—Emmanuel L Moise
*Assistant Examiner*—Ali S Abyaneh
(74) *Attorney, Agent, or Firm*—Kilpatrick Stockton LLP

(57) ABSTRACT

Systems and methods for mutual encryption of network nodes are described. One described method includes transmitting a communication from a client to a server, the communication associated with a credential, the credential having a user identifier and a first token and receiving the communication at the server. The method further includes determining a second token associated with the user identifier on the server and on the client and generating an encryption key based at least in part on the second token on the server and on the client. The method further includes generating and encrypting an encrypted authentication request on the client; transmitting the encrypted authentication request to the server; receiving the encrypted authentication request on the server; decrypting the encrypted authentication request using the encryption key on the server; generating and encrypting an encrypted authentication response on the server; and transmitting the encrypted authentication response to the client.

26 Claims, 8 Drawing Sheets

U.S. PATENT DOCUMENTS

| | | | |
|---|---|---|---|
| 6,418,533 | B2 | 7/2002 | Angelo et al. |
| 6,546,425 | B1 | 4/2003 | Hanson et al. |
| 6,564,047 | B1 | 5/2003 | Steele et al. |
| 6,643,701 | B1 * | 11/2003 | Aziz et al. ............ 709/227 |
| 6,657,956 | B1 | 12/2003 | Sigaud |
| 6,725,379 | B1 | 4/2004 | Dailey |
| 6,813,498 | B1 | 11/2004 | Durga et al. |
| 6,865,162 | B1 | 3/2005 | Clemm |
| 6,880,079 | B2 * | 4/2005 | Kefford et al. ............ 713/155 |
| 6,947,755 | B1 | 9/2005 | Gould et al. |
| 6,996,728 | B2 | 2/2006 | Singh |
| 7,003,282 | B1 | 2/2006 | Ekberg |
| 7,051,236 | B2 | 5/2006 | Sanu |
| 7,054,594 | B2 | 5/2006 | Bloch et al. |
| 7,089,425 | B2 | 8/2006 | Chan |
| 7,089,553 | B1 | 8/2006 | Glaser et al. |
| 7,107,349 | B2 | 9/2006 | Britt, Jr. |
| 7,170,999 | B1 | 1/2007 | Kessler et al. |
| 7,239,862 | B1 | 7/2007 | Clare et al. |
| 7,272,230 | B2 | 9/2007 | Sasaki |
| 7,305,548 | B2 | 12/2007 | Pierce et al. |
| 7,370,349 | B2 | 5/2008 | Holvey et al. |
| 7,389,123 | B2 | 6/2008 | Rydgren et al. |
| 7,392,390 | B2 | 6/2008 | Newcombe |
| 7,392,391 | B2 | 6/2008 | Eibach et al. |
| 7,409,061 | B2 | 8/2008 | Newcombe |
| 7,421,503 | B1 * | 9/2008 | Stieglitz et al. ............ 709/229 |
| 2002/0039359 | A1 | 4/2002 | Gerszberg et al. |
| 2002/0052968 | A1 | 5/2002 | Bonefas et al. |
| 2002/0099957 | A1 | 7/2002 | Kramer et al. |
| 2002/0133584 | A1 | 9/2002 | Greuel et al. |
| 2003/0005331 | A1 | 1/2003 | Williams |
| 2003/0051140 | A1 * | 3/2003 | Buddhikot et al. ............ 713/169 |
| 2003/0056116 | A1 | 3/2003 | Bunker et al. |
| 2003/0084350 | A1 | 5/2003 | Eibach et al. |
| 2003/0204748 | A1 | 10/2003 | Chiu |
| 2003/0212548 | A1 | 11/2003 | Petty |
| 2003/0217166 | A1 | 11/2003 | Dal Canto et al. |
| 2003/0235307 | A1 | 12/2003 | Miyamoto |
| 2003/0236827 | A1 | 12/2003 | Patel et al. |
| 2004/0030887 | A1 | 2/2004 | Harrisville-Wolff et al. |
| 2004/0039807 | A1 | 2/2004 | De Miguel et al. |
| 2004/0052259 | A1 | 3/2004 | Garcia et al. |
| 2004/0064293 | A1 | 4/2004 | Hamilton et al. |
| 2004/0110488 | A1 | 6/2004 | Komsi |
| 2004/0123150 | A1 | 6/2004 | Wright et al. |
| 2004/0143470 | A1 | 7/2004 | Myrick et al. |
| 2004/0193694 | A1 | 9/2004 | Salo et al. |
| 2004/0235514 | A1 | 11/2004 | Bloch et al. |
| 2004/0259538 | A1 | 12/2004 | Agbegnenou |
| 2005/0020315 | A1 | 1/2005 | Robertson |
| 2005/0025184 | A1 | 2/2005 | Dowling et al. |
| 2005/0273592 | A1 | 12/2005 | Pryor et al. |
| 2006/0149414 | A1 | 7/2006 | Archacki et al. |
| 2007/0125620 | A1 | 6/2007 | Sorenson et al. |

FOREIGN PATENT DOCUMENTS

| | | |
|---|---|---|
| EP | 0849909 | 6/1998 |
| EP | 0 886 409 A2 | 12/1998 |
| EP | 0 899 647 A2 | 3/1999 |
| EP | 0899647 | 3/1999 |
| EP | 1059782 | 12/2000 |
| EP | 1 320 013 A2 | 6/2003 |
| EP | 1320013 | 6/2003 |
| GB | 2210482 | 6/1989 |
| GB | 2 210 482 | 6/1999 |
| WO | WO 99/00958 | 1/1999 |
| WO | WO 00/05684 | 2/2000 |
| WO | WO 00/78004 | 12/2000 |
| WO | WO 01/35585 | 5/2001 |
| WO | WO 01/89249 | 11/2001 |
| WO | WO 02/23362 | 3/2002 |
| WO | WO 02/41580 | 5/2002 |
| WO | WO 02/077816 | 10/2002 |
| WO | WO 02/084938 | 10/2002 |
| WO | WO 02/091662 | 11/2002 |
| WO | WO 02/091662 A1 | 11/2002 |
| WO | WO 03/073782 | 9/2003 |
| WO | WO 2004/008693 | 1/2004 |
| WO | WO 2004/014011 | 2/2004 |
| WO | WO 2004/021114 | 3/2004 |
| WO | WO 2004/028069 A1 | 4/2004 |
| WO | WO 2004/036864 A2 | 4/2004 |

OTHER PUBLICATIONS

United States Patent and Trademark Office, Office Action, U.S. Appl. No. 11/170,608, mailed Jul. 16, 2008.

Anonymous, "$3^{rd}$ Generation Partnership Project; Technical Specification Group Service and System Aspects; 3G, Security; Wireless Local Area Network (WLAN) interworking security (Release 6)"; 3GPP TS 33.234, "Online!", Jun. 15, 2004; pp. 11-18, 20-22.

Matsunaga et al., "Secure Authentication System for Public WLAN Roaming"; WMASH 2003. Proceedings of the $1^{st}$ ACM International Workshop on Wireless Mobile Applications and Services on WLAN Hotspots, San Diego, CA Sep. 19, 2003; pp. 113-121.

International Search Report mailed Nov. 28, 2005 corresponding to PCT/US2005/021526.

DOD: "Department of Defense Trusted Computer System Evaluation Criteria" The Rainbow Books, Dec. 26, 1985.

Matsunaga, et al. "Secure Authentication System for Public WLAN Roaming" W Mash 2003, Proceedings of the $1^{st}$ ACM International Workshop on Wireless Mobile Applications and Services on WLAN Hotspots, Sep. 19, 2003.

Anonymous: "$3^{rd}$ Generation Partnership Project: Technical Specification Group Service and System Aspects; 3G Security; Wireless Local Area Network (WLAN) Interworking Security (Release 6)," Jun. 15, 2004.

Gavi—Federation of Telecommunications Engineers of the European Community (FITCE)/Institution of British Telecommunication: "Service Level Management for IP Networks," Aug. 24, 1999.

"SNMP: Simple Network Management Protocol DES IAB", Jun. 1, 1995.

Barberis, et al. "A Simulation Study of Adaptive Voice Communications on IP Networks," Computer Communications, May 1, 2001.

Homayounfar "Rate Adaptive Speech Coding for Universal Multimedia Access," IEEE Signal Processing Magazine, Mar. 2003.

Escobedo, et al. "Convivo Communicator: an Interface-Adaptive VoIP System for Poor Quality Networks," Journal of Information Communication & Ethics in Society (ICES), Jul. 2003.

Hoene, et al. "A Perceptual Quality Model for Adaptive VoIP Applications," Internet Article, Jul. 2004.

Mehrpour, et al. "Packet Voice Transmission Using Java Programming Language," Tencon '97, IEEE Region 10 Annual Conference, Dec. 2, 1997.

PCT International Search Report/Written Opinion for PCT/US2005/021370 dated Dec. 28, 2006.

PCT International Search Report/Written Opinion for PCT/US2005/021526 dated Dec. 28, 2006.

PCT International Search Report/Written Opinion for PCT/US2005/022586 dated Dec. 28, 2006.

PCT International Search Report/Written Opinion for PCT/US2005/022982 dated Dec. 28, 2006.

PCT International Search Report/Written Opinion for PCT/US2005/022983 dated Dec. 28, 2006.

PCT International Search Report/Written Opinion for PCT/US2005/022984 dated Dec. 28, 2006.

PCT International Search Report/Written Opinion for PCT/US2005/023278 dated Dec. 28, 2006.

PCT International Search Report/Written Opinion for PCT/US2005/023280 dated Dec. 28, 2006.

PCT International Search Report/Written Opinion for PCT/US2005/046665 dated Jul. 10, 2007.

DOD, "Department of Defense Trusted Computer System Evaluation Criteria", The Rainbow Books, Dec. 26, 1985.

Gavi, Luciano; "Service Level Management for IP Networks"; 38$^{th}$ European Telecommunications Congress. Proceedings Networking the Future. Utrecht, NL Aug. 24-28, 1999, London: IBTE, GB, Aug. 24, 1999; pp. 106-109.

SNMP: Simple Network Management Protocol Des IAB; NTZ (Nachrichtentechnische Zeitschrift), VDE Verlag GmbH. Berlin, DE vol. 48, No. 6, Jun. 1, 1995 pp. 20-22.

PCT/US2005/022983 International Search Report dated Oct. 24, 2005.

PCT/US2005/022982 International Search Report dated Oct. 27, 2005.

PCT/US2005/022984 International Search Report dated Nov. 4, 2005.

PCT/US2005/023280 International Search Report dated Nov. 16, 2005.

PCT/US2005/022586 International Search Report dated Nov. 18, 2005.

PCT/US2005/021526 International Search Report dated Nov. 28, 2005.

PCT/US2005/021370 International Search Report dated Dec. 2, 2005.

PCT/US2005/023278 International Search Report dated Feb. 2, 2006.

PCT/US2005/046665 International Search Report dated Jul. 17, 2006.

PCT/US2005/021370 International Preliminary Report on Patentability dated Jan. 11, 2007.

PCT/US2005/021526 International Preliminary Report on Patentability dated Jan. 11, 2007.

PCT/US2005/022586 International Preliminary Report on Patentability dated Jan. 11, 2007.

PCT/US2005/022982 International Preliminary Report on Patentability dated Jan. 11, 2007.

PCT/US2005/022983 International Preliminary Report on Patentability dated Jan. 11, 2007.

PCT/US2005/022984 International Preliminary Report on Patentability dated Jan. 11, 2007.

PCT/US2005/023278 International Preliminary Report on Patentability dated Dec. 28, 2006.

PCT/US2005/023280 International Preliminary Report of Patentability dated Dec. 28, 2006.

PCT/US2005/046665 International Preliminary Report on Patentability dated Jul. 10, 2007.

United States Patent and Trademark Office U.S. Appl. No. 11/167,745 Response to Office Action dated Aug. 15, 2008.

United States Patent and Trademark Office U.S. Appl. No. 11/170,608 Response to Office Action dated Oct. 15, 2008.

United States Patent and Trademark Office U.S. Appl. No. 11/167,745 Non-Final Office Action dated Nov. 14, 2008.

PCT/US2007/064412 International Search Report dated Nov. 26, 2008.

United States Patent and Trademark Office U.S. Appl. No. 11/170,608 Final Office Action dated Jan. 27, 2009.

* cited by examiner

US 7,760,882 B2

SYSTEMS AND METHODS FOR MUTUAL AUTHENTICATION OF NETWORK NODES

RELATED APPLICATIONS

This application claims priority to Application Ser. No. 60/583,765, filed on Jun. 28, 2004, titled "Controlling Use of a Mobile Work Station Based on Network Environment," Application Ser. No. 60/598,364, filed on Aug. 3, 2004, titled "Systems and Methods for Enhancing and Optimizing a User's Experience on an Electronic Device," Application Ser. No. 60/652,121, filed on Feb. 11, 2005, titled "Remote Access Services," and Application Ser. No. 60/653,411, filed on Feb. 16, 2005, titled "Creating an Environment for Secure Mobile Access Anywhere," the entirety of all of which are incorporated herein by reference.

FIELD OF THE INVENTION

The present invention relates generally to computer networking and, more particularly to systems and methods for mutual authentication of network nodes.

BACKGROUND

Wireless hotspots are becoming more prevalent. To access a wireless hotspot, a user utilizes a communications device in a laptop, PDA or other wireless-enabled device that allows the wireless-enabled device to communicate with an access point. For example, a laptop may include built-in wireless capability, or the user may plug in a PC card to provide the wireless functionality. The wireless communication device typically uses a standard protocol, such as the 802.11b protocol, to communicate with the access point.

The standard protocols support basic authentication protocols, including Wireless Equivalent Privacy (WEP) and Wi-Fi Protected Access (WPA). Unfortunately, both of these authentication protocols are easily breachable with basic attack strategies available over the Web and therefore do not provide an acceptable level of security for many users and corporations. A new standard, 802.1x, addresses some of these security issues. However, the new standard requires changes in hardware and software and will take time to implement. Thus some current and future Wireless Local Area Network (WLAN) equipment and telecommunication carriers may not support the enhanced authentication protocol immediately or at all.

Additionally, the access point typically has no mechanism that allows a wireless-enabled device attempting to connect to an authentication server on the other side of the access point to verify that the authentication response it receives, supposedly from the authentication server, is genuine. This security hole makes it difficult to identify a rogue access point—an access point set up to impersonate an authentication server and gain unauthorized access to information on the wireless-enabled devices or from transmissions from the wireless-enabled devices.

SUMMARY

Embodiments of the present invention provide methods and systems for mutual authentication of network nodes. Mutual authentication provides a means for two network nodes to authenticate one another without requiring that an encryption key or other security token be passed between the nodes. One method according to one embodiment of the present invention comprises: transmitting a communication from a client to a server, the communication associated with a credential, the credential having a user identifier and a first token and receiving the communication at the server. The method further comprises determining a second token associated with the user identifier on the server and on the client and generating an encryption key based at least in part on the second token on the server and on the client. The method further comprises generating and encrypting an encrypted authentication request on the client; transmitting the encrypted authentication request to the server; receiving the encrypted authentication request on the server; decrypting the encrypted authentication request using the encryption key on the server; generating and encrypting an encrypted authentication response on the server; and transmitting the encrypted authentication response to the client.

This illustrative embodiment is mentioned not to limit or define the invention, but to provide one example to aid understanding thereof. Illustrative embodiments are discussed in the Detailed Description, and further description of the invention is provided there. Advantages offered by the various embodiments of the present invention may be further understood by examining this specification.

FIGURES

These and other features, aspects, and advantages of the present invention are better understood when the following Detailed Description is read with reference to the accompanying drawings, wherein.

DETAILED DESCRIPTION

Introduction

Figure 1:
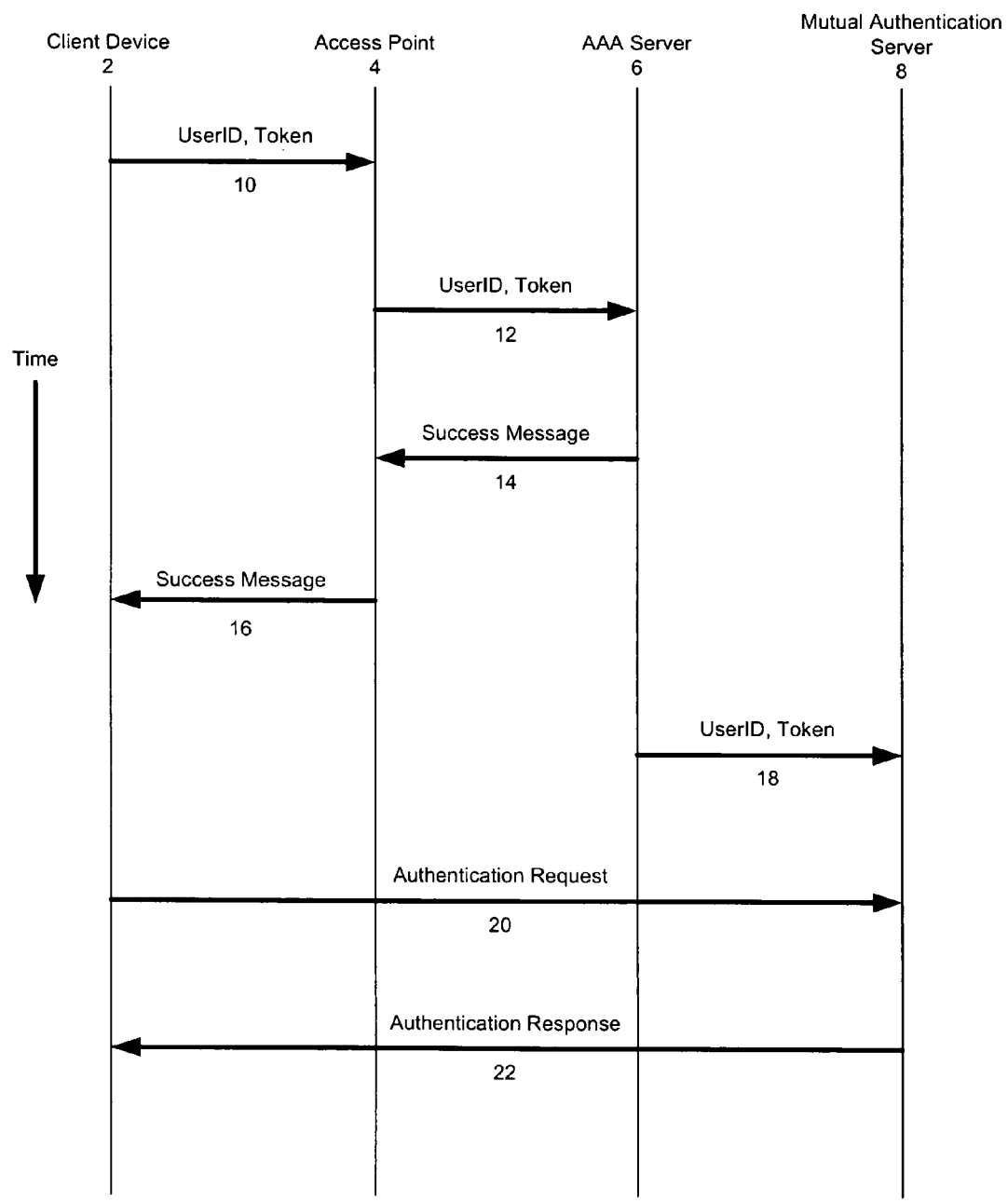
FIG. 1 is a timing diagram illustrating an implementation of two-stage mutual authentication in one embodiment of the present invention.

Embodiments of the present invention comprise methods and systems for mutual authentication of network nodes. There are multiple embodiments of the present invention. By way of introduction and example, one illustrative embodiment of the present invention provides a method for two-stage mutual authentication. FIG. 1 is a timing diagram illustrating an implementation of two-stage mutual authentication in one embodiment of the present invention.

The timing diagram shown in FIG. 1 illustrates messages flowing between various nodes on a network (not shown). The network devices include a client 2, an access point 4, a AAA server 6, which may also be referred to as a Radius server and is responsible for access, authentication, and accounting (AAA), and a mutual authentication server 8. Each of these network nodes is described in further detail in relation to FIG. 2 below. In various embodiments, each of these nodes may actually comprise more than one computer or may be combined on a single computer. For example, in the embodiment shown in FIG. 2 and described in relation to FIGS. 3 through 8, the AAA server 6 is implemented as a first and final authentication server.

A user may attempt to authenticate on a network, such as, for example, a WiFi network, in order to, perhaps, access an employer's extranet. In order to authenticate on the network, the user supplies a credential. The credential may include one or more attributes, including, for example, one or more of a user identifier, a password or personal id number (PIN), and a token. The token may be, for example, a one-time password generated from a mathematical algorithm or retrieved from a list. The client device 2 first attaches to the access point 4 and is provided with an Internet Protocol (IP) address. The client 2 then transmits the credential, including the user identifier and token to the access point (4) 10. The access point passes the user identifier and token to the AAA server (6) 12.

The AAA server 6 receives the credential and evaluates the user identifier and token and may evaluate other attributes supplied by the user or client 2. If the credential is valid, the AAA server 6 sends a reply message to the access point 4, indicating that the authentication was successful 14. The access point 4 then forwards the success message to the client (2) 16. If the credential is invalid, the AAA server 6 will send a failure message, and the user may try to log on again. The process of receiving a credential and authenticating a user described above is typical of the process performed by conventional systems. The embodiment of the present invention shown in FIG. 1 also provides an additional measure of security.

The AAA server 6 forwards the user identifier and token to the mutual authentication server (8) 18. The mutual authentication server 8 retrieves a second token. The second token may be, for example, the next password in a password list or the next password generated by the mathematical algorithm. In any event, the second token is a token that can be generated on both the client device 2 and the mutual authentication server 8 independently without the need for passing the token across communication lines between the two.

The mutual authentication server 8 then generates an encryption key using at least the second token. For example, the authentication server may use the second token as a seed to generate the key. Alternatively, the mutual authentication server 8 may use the token in combination with the user identifier, password, and other information (e.g., the IP address of the client) to generate the encryption key. The method used to generate the key may be a conventional encryption key generation method.

If the client 2 receives an indication that the authentication was unsuccessful, the client disconnects. For example, if the user identifier and password are invalid, the AAA server 6 may send the failure message as described above. If the authentication is successful, then when the client 2 receives the success message, the client 2 retrieves a second token and generates an encryption key using the second token and may use additional information to generate the encryption key as well. The manner of generating the encryption key on the client 2 is identical to the manner of generating the encryption key on the mutual authentication server 8. Thus, the keys are identical.

The client 2 then generates an authentication request and encrypts the request using the encryption key generated using the second token. The encryption method utilized by the client 2 may be a conventional encryption method. The client 2 then sends the authentication request to the mutual authentication server (8) 20.

The mutual authentication server 8 attempts to decrypt the request using the key generated on the mutual authentication server 8. If the encryption keys on the client 2 and mutual authentication server 8 are identical, the mutual authentication server 8 will be able to decrypt the authentication request and evaluate the decrypted request. If the mutual authentication server 8 successfully decrypts and evaluates the authentication request from the client, the mutual authentication server 8 sends an authentication response to the client (2) 22.

The client 2 attempts to decrypt the authentication response using the encryption key. If successful, the 2-stage mutual authentication is successful. The client 2 may use the information in the authentication response for various purposes. For example, the client 2 may be able to determine that the access point 4 is a valid access point, i.e., not a rogue access point attempting to surreptitiously gain access to data from the client.

The client 2 may also be able to use the communication channel with the mutual authentication server 8 as an additional layer of security. For example, the communication line established between the client 2 and the mutual authentication server 8 is, in effect, a virtual private network (VPN)—all communication between the client 2 and the mutual authentication server 8 is encrypted using the encryption key, which is independently generated on both the client 2 and mutual authentication server 8. This encryption can be used instead of or in addition to any other security measures in place.

This introduction is given to introduce the reader to the general subject matter of the application. By no means is the invention limited to such subject matter. Illustrative embodiments are described below.

System Architecture

Figure 2:
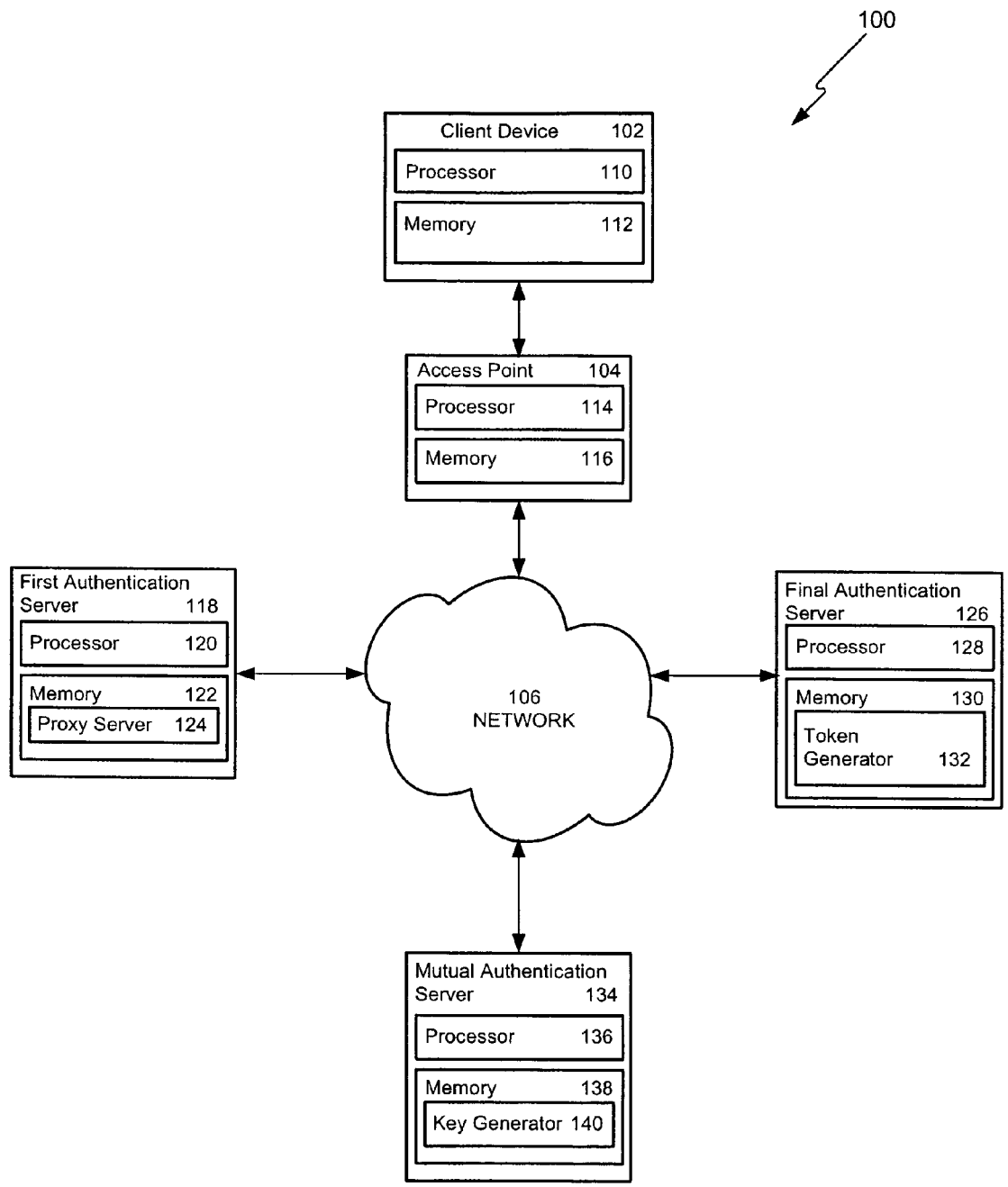
FIG. 2 is a block diagram showing an illustrative environment for implementation of one embodiment of the present invention.

Various systems in accordance with the present invention may be constructed. Referring now to the drawings in which like numerals indicate like elements throughout the several figures, FIG. 2 is a block diagram showing an illustrative environment for implementation of one embodiment of the present invention. The system 100 shown in FIG. 2 comprises a client device 102 in communication with an access point 104. The access point 104 is in communication with a first authentication server 118, a final authentication server 126, and a mutual authentication server 134 over a network 106. In one embodiment, the network 106 shown comprises the Internet. The network may also comprise an intranet, a Local Area Network (LAN), a telephone network, or a combination of suitable networks. The client device 102, the access point 104, and the server devices 118, 126, and 134 may connect to the network 106 through wired, wireless, or optical connections and the network itself may be wired or wireless or a combination of both.

Client Devices

Examples of client device 102 are personal computers, digital assistants, personal digital assistants, cellular phones, mobile phones, smart phones, pagers, digital tablets, laptop computers, Internet appliances, and other processor-based devices. In general, a client device 102 may be any suitable type of processor-based platform that is connected to a network 106, such as through access point 104, and that interacts with one or more application programs. The client device 102 can contain a processor 110 coupled to a computer-readable medium, such as memory 112. Client device 102 may operate on any operating system, such as Microsoft® Windows® or Linux. The client device 102 is, for example, a personal computer executing a browser application program such as Microsoft Corporation's Internet Explorer™, Netscape Communication Corporation's Netscape Navigator™, Mozilla Organization's Firefox, Apple Computer, Inc.'s Safari™, Opera Software's Opera Web Browser, and the open source Linux Browser.

Access Point

The access point 104 is a communication hub for devices connecting to network 106. The access point 104 may be a dedicated hardware device or may be a general-purpose computer executing access point software 104. The access point 104 may be wired or wireless. The access point 104 includes a processor 114 and memory 116.

The memory 116 includes software code for accessing the network. For example, the memory 116 may include software code for supporting Dynamic Host Configuration Protocol (DHCP) and supporting Hypertext Transfer Protocol (HTTP) administrative access to the access point 104. Access points are available from a variety of manufactures, such as, for example, Linksys.

Server Devices

The server devices 118, 126, and 134 contain processors 120, 128, 136 coupled to a computer-readable medium, such as memory 122, 130, 138. The memory comprises one or more applications.

In the embodiment shown in FIG. 2, memory 122 of first authentication server 118 comprises a proxy server 124. The proxy server 124 acts as a gateway between the client application and the final authentication server 126. Such proxying is typical in such an authentication environment because the credentials supplied by a user for authentication are often not known to the first authentication server, but information in the authentication request indicates to the first authentication server that another authentication server (i.e. the final authentication server) will be able to authenticate the user.

Memory 130 of final authentication server 126 comprises a token generator 132. The token generator 132 generates and supplies a token in response to a request. The token may be generated from a list of pre-existing tokens or by using a mathematical algorithm. The token generator may be, for example, a SafeWord token generator.

The memory 138 of the mutual authentication server 134 comprises a key generator 140. The key generator 140 uses a set of information to create an encryption key. The process for generating the key is described in detail below.

The server devices 118, 126, 134 may utilize a Radius server, which is an open source server for authentication and accounting. A Radius server supports a variety of authentication schemes.

Server devices 118, 126, 134, which are depicted as single computer systems, may be implemented as a network of computer processors. Server devices 118, 126, 134 may instead comprise a single physical server executing various applications to support the processes described herein.

Examples of server devices 118, 126, 134 are a server, mainframe computer, networked computer, or other processor-based devices, and similar types of systems and devices. Client processor 110 and server processors 118, 126, 134 can be any of a number of computer processors, as described below, such as processors from Intel Corporation of Santa Clara, Calif. and Motorola Corporation of Schaumburg, Ill.

Such processors may include a microprocessor, an ASIC, and state machines. Such processors include, or may be in communication with computer-readable media, which stores program code or instructions that, when executed by the processor, cause the processor to perform actions. Embodiments of computer-readable media include, but are not limited to, an electronic, optical, magnetic, or other storage or transmission device capable of providing a processor with computer-readable instructions. Other examples of suitable media include, but are not limited to, a floppy disk, CD-ROM, DVD, magnetic disk, memory chip, ROM, RAM, an ASIC, a configured processor, optical media, magnetic tape media, or any other suitable medium from which a computer processor can read instructions. Also, various other forms of computer-readable media may transmit or carry program code or instructions to a computer, including a router, private or public network, or other transmission device or channel, both wired and wireless. The instructions may comprise program code from any computer-programming language, including, for example, C, C++, C#, Visual Basic, Java, Python, Perl, and JavaScript. Program code running on the access point 104 and server devices 118, 126, 134 may include web server software, such as the open source Apache Web Server and the Internet Information Server (IIS) from Microsoft Corporation.

It should be noted that the present invention may comprise systems having a different architecture than that which is shown in FIG. 2. For example, in some systems according to the present invention, first authentication server 118 and final authentication server 126 may be combined in a single server. The system 100 shown in FIG. 2 is merely illustrative, and is used to help explain the illustrative systems and processes discussed below.

Illustrative Processes for Mutual Authentication

Figure 3:
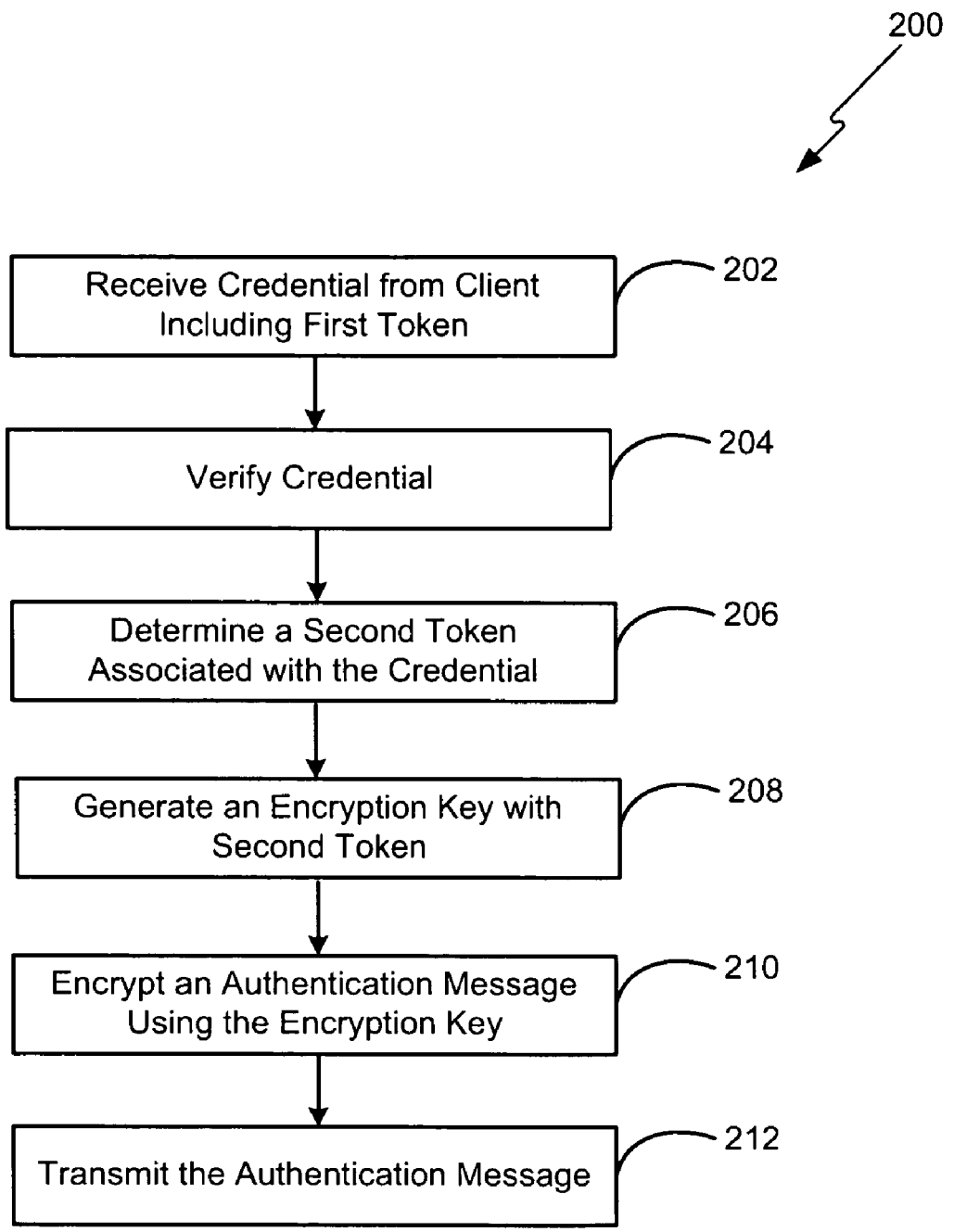
FIG. 3 is a flow chart illustrating a method for providing an authentication message in one embodiment of the present invention.

Embodiments of the present invention provide systems and methods for mutual authentication of network nodes. FIG. 3 is a flow chart illustrating a method for providing an authentication message in one embodiment of the present invention. In the embodiment shown, a user enters a credential, including a token (e.g., a password), into an application executing on a client device 102. The credential may also include the user's user identifier, a plain text password, or other attributes. The user then submits the information to an authentication server, such as first authentication server 118, final authentication server 126, or mutual authentication server 134. In one embodiment, the client 102 automatically supplies the credential and submits the information to an authentication server without requiring that the user enter the information. When the information is submitted, it is first received by the access point 104 and then forwarded to one of the servers 118, 126, 134 via the network 106 based on header information in the packet sent by the client 102. The client 102 addresses the packet based on address information provided in the authentication software. For example, the client authentication software may include the IP address of the server to which authentication requests are directed. The authentication server corresponding with the IP address may be any of the servers 118, 126, 134 shown in FIG. 2 or a server combining the functionality of one of the server 118, 126, 134 shown. In another embodiment, a web address, e.g., www.example.com, is used instead of an IP Address.

For simplicity, the process 200 shown in FIG. 3 will be described in relation to the first authentication server 118. In such an embodiment, the first authentication server would combine the functionality of the three servers 118, 126, 134 shown in FIG. 2. The process 200 begins when the authentication server 118 receives the credential from the client 102, including the token 202. The credential may comprise, for example, a user identifier, a token, and the IP address of the client 102. The authentication server 118 then verifies the credential 204. For example, the token may comprise a password from a password list or that is generated from an algorithm. The authentication server 118 uses the same password list or algorithm to determine the password associated with the user id and compares the password generated with the password received from the client 102. In one embodiment, the user submits a user identifier that includes a first portion, an "@" symbol, and a second portion, the "@" symbol between the first and second portion (e.g., user@example.com). The first portion submitted by the user is a temporary identifier. When the authentication server 118 receives the request, it replaces the temporary identifier with a permanent or semi-permanent identifier. For instance, the user submits "temp@example.com," and the authentication server 118 replaces "temp" with "user" before processing the request. The authentication server 118 may determine the permanent identifier by, for example, searching a lookup table for the IP address of the client 102. Such an embodiment provides additional security by ensuring that the permanent identifier is not disclosed before the request reaches the authentication server 118.

The authentication server 118 next determines a second token associated with the credential 206. For instance, the authentication server 118 may utilize the password algorithm to generate the next password associated with a user identifier received in the credential.

The authentication server 118 next generates an encryption key using the second token 208. The authentication server may utilize the second token in combination with other attributes of the credential to generate the key. For instance, the authentication server 118 may use the second token in combination with the user identifier and IP address of the client 102 to generate the encryption key. In the embodiment shown in FIG. 2, the encryption key is generated using conventional systems and methods. In other embodiments, non-conventional systems and methods for encryption may be used.

Concurrently, the client uses the same mechanism to derive the same second token and subsequent encryption key. The Client then uses the encryption key to encrypt an authentication message 210. The encryption utilized in the embodiment of the invention shown in FIG. 3 is symmetric—the encryption and decryption keys are the same. Symmetric encryption is typically faster and less complex than asymmetric (e.g., public key/private key) encryption. An embodiment of the present invention is able to use symmetric encryption in a secure manner since the keys are not exchanged over the communication link. Various methods of encryption may be utilized by an embodiment of the present invention. Examples of conventional encryption routines that may be utilized include Advanced Encryption Standard (AES), also referred to as Rijndael, Data Encryption Standard (DES), Triple DES (3DES), and Blowfish. Other suitable encryption routines may also be used.

Fundamentally, the authentication message validates that the client was indeed authenticated against the authentication server that it should have been authenticated against, however, the secure messaging tunnel that has been built through this independent generation of symmetric keys may be used for other purposes. The client then transmits the authentication message to the authentication server.

Figure 4:
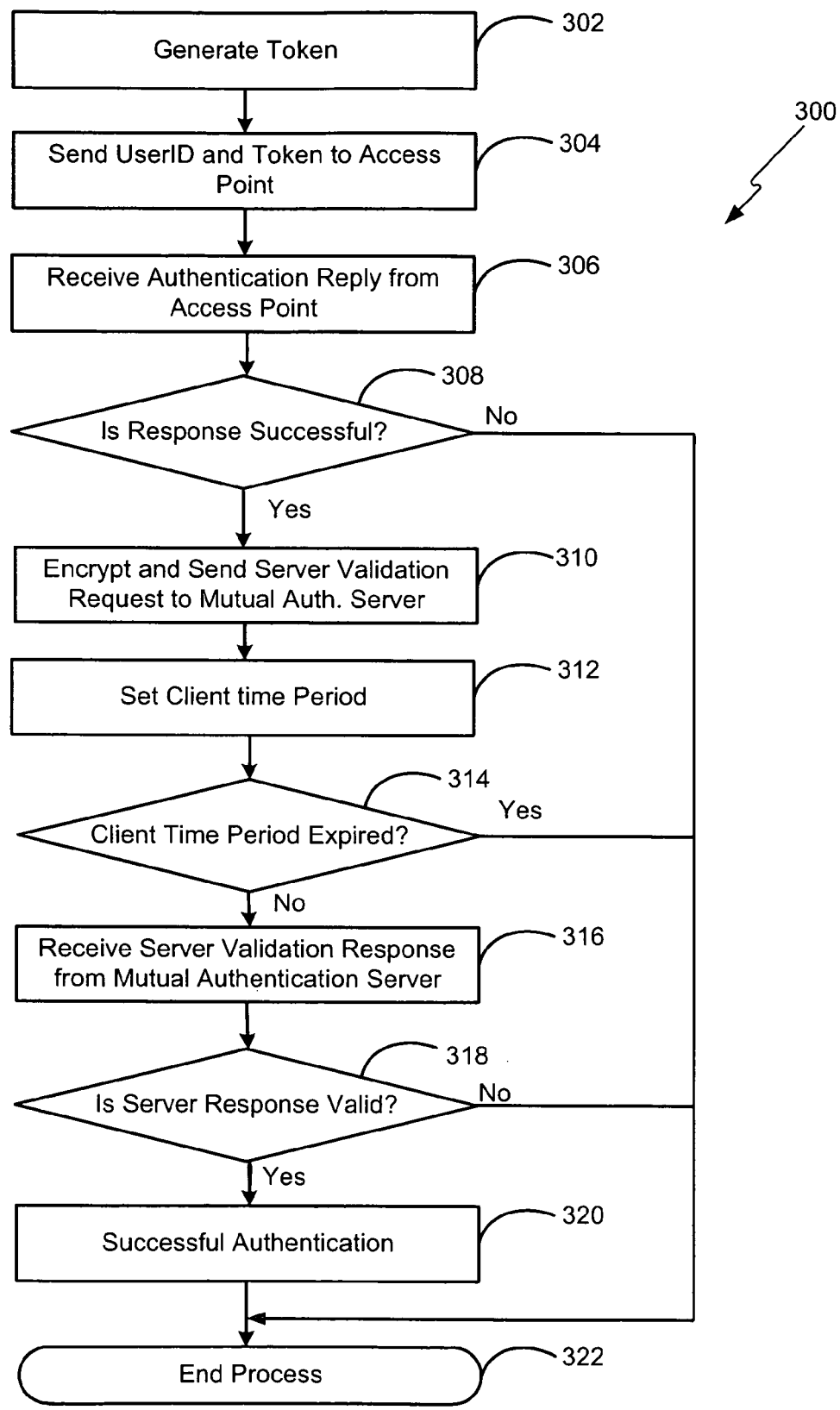
FIG. 4 is a flowchart illustrating a method for mutual authentication from a client perspective in one embodiment of the present invention.

FIG. 4 is a flowchart illustrating a method for mutual authentication from a client perspective in one embodiment of the present invention. In the process 300 shown, the client 102 generates a token 302. The token may comprise, for example, a one-time password generated using a computer algorithm.

The client 102 may identify a particular access point 104. Alternatively, the client 102 may poll the surrounding area to determine the service set identifier (SSID) of the strongest access point available and use that access point. The client 102 may also connect to the network 106 via a wired connection, a WWAN (Cellular) connection, or a WAN (Dial-up) connection. The access point 104 will forward the authentication request generated at the client to the appropriate authentication server, such as first authentication server 118.

The client next receives from the access point 104 an authentication reply originating from the authentication server 306. The response may indicate a success or failure in authentication 308. If the response is not successful, the process ends 322. The actual format of this response may vary; it could be return value to a function call, but it could also simply be a redirect to a web page with text indicating that an authentication attempt failed. The client 102 will then disconnect from the access point 104. The client 102 may also create a log recording the invalid authentication or may inform the user that the authentication was invalid or both.

If the process is successful, the client encrypts a server validation request and sends it to the mutual authentication server (134) 310. The server validation request is a request for validation that the server that authenticated the client 102 is valid. In other words, the server with which the client 102 is communicating is not spoofing a valid server in an attempt to gain confidential information from the client 102. For example, the user of the client 102 may want to ensure that any password information is not being passed to a rogue server. One embodiment of the present invention utilizes mutual authentication to ensure that each client that the final authentication server authenticates is valid, i.e., an unauthorized client is attempting to access the final authentication server. If the client is not authorized, the client may be kicked of the access point 104 or ignored by the mutual authentication server 134 or both. The mutual authentication process described herein may be used for other purposes as well.

The client 102 generates an encryption key using the credential and a second token. For example, if the client 102 utilizes a one-time password generation algorithm to generate the first token, the client 102 utilizes the algorithm to generate a second token. The client 102 then uses the user identifier and IP address in conjunction with the second token to generate the encryption key. The encryption key is identical to an encryption key generated on the mutual authentication server 134.

The client 102 then sets a client time period 312. During the client time period, the client 102 will wait for a response. When the client time period expires 314, the process will end 322. In other words, the client 102 will not accept a response after expiration of the client time period. The client 102 may also terminate the connection with the access point 104 upon expiration of the client time period. The client 102 may also log the unsuccessful attempt and may notify the user of the failure.

If the client time period has not expired, the client 102 will wait for a response. In the process 300 shown, the client 102 next receives a server validation response from the mutual authentication server (134) 316.

The client 102 validates the server validation response 318. The client 102 validates the server authentication response by utilizing the encryption key. The algorithm used by the client to generate the key is the same one used by the mutual authentication server 134 to generate the key used to encrypt the server validation request. Thus, if the client 102 is able to decrypt the validation response with the key, the client 102 verifies that the client 102 and the mutual authentication server 134 are using the same key. The client 102 then validates the response itself.

If the response is invalid, the authentication process 300 ends 322. If the response is valid, then a successful authentication has occurred 320. The authentication process 300 then ends 322. The client 102 has successfully completed the two-stage mutual authentication.

Figure 5:
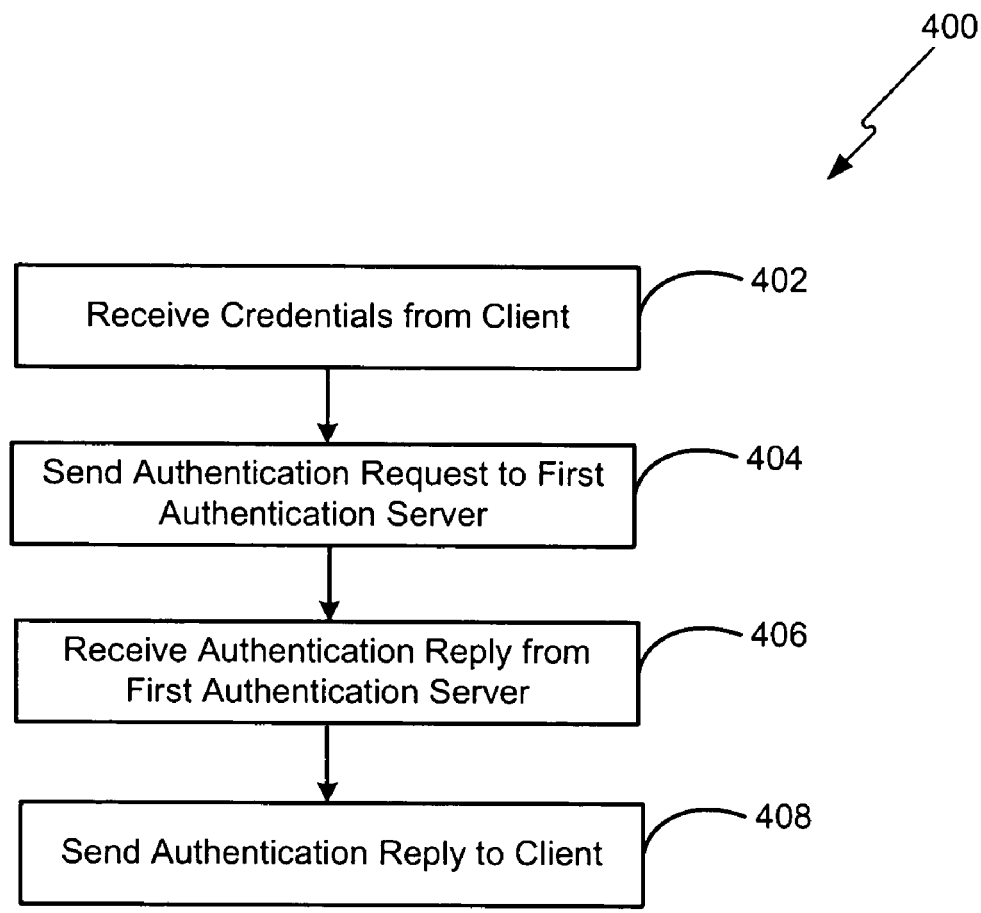
FIG. 5 is a flowchart illustrating a method for mutual authentication from an access point perspective in one embodiment of the present invention.

FIG. 5 is a flowchart illustrating a method for mutual authentication from an access point perspective in one embodiment of the present invention. In the process 400 shown, the access point 104 receives a credential from the client (102) 402. As described above, the credential includes a user identifier and token.

The access point 102 sends the credential to the first authentication server (118) 404. The first authentication server 118 and other authentication servers 126, 134 process the request and transmit an authentication reply to the access point 104 via the first authentication server 118.

The access point 104 receives the authentication reply form the first authentication server (118) 406. The access point 104 acts as a conduit for sending and receiving messages. The access point 104 transmits the authentication reply to the client (102) 408. The access point 104 may perform other processes as well. For example, the access point 104 typically acts as a DHCP server for the client 102.

Figure 6:
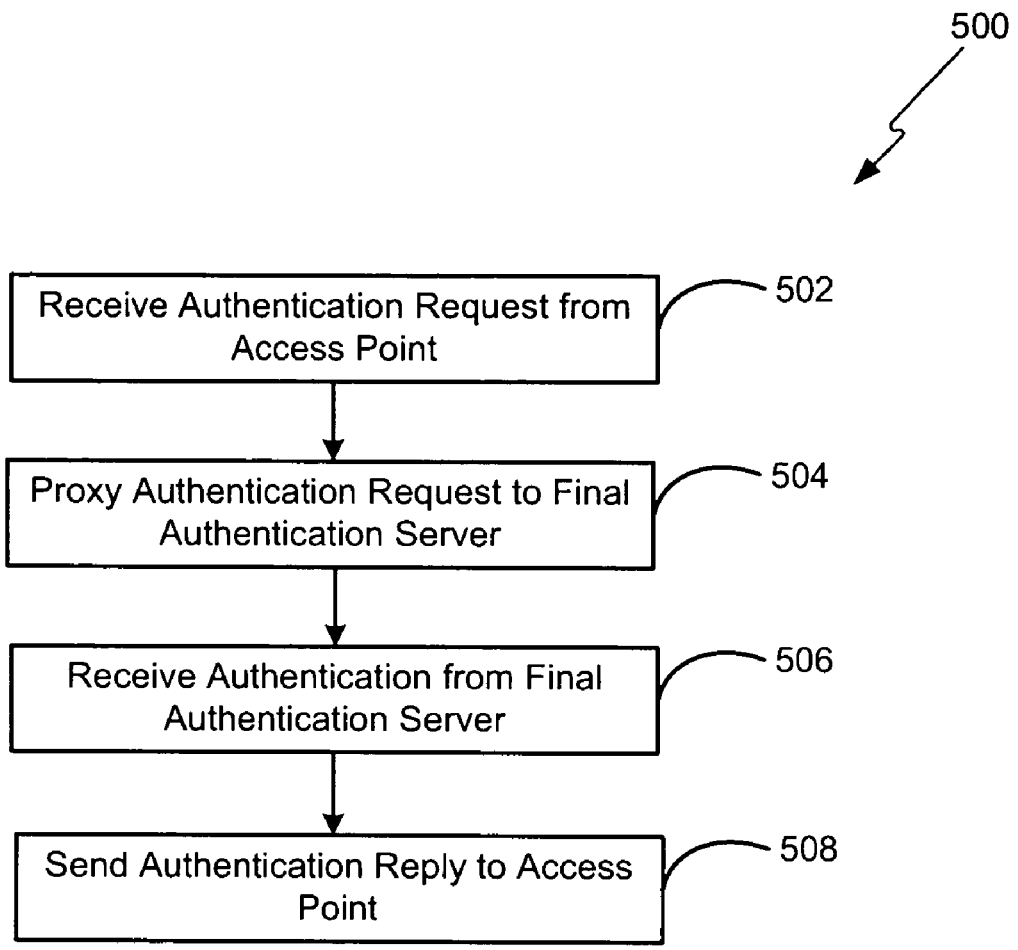
FIG. 6 is a flowchart illustrating a method for mutual authentication from a first authentication server perspective in one embodiment of the present invention.

FIG. 6 is a flowchart illustrating a method for mutual authentication from a first authentication server perspective in one embodiment of the present invention. In the process 500 shown, the first authentication server 118 receives an authentication request from the access point (104) 502. The authentication request includes a user identifier and token.

The first authentication server 118 proxies the authentication request to the final authentication server (126) 504. In some embodiments, the first authentication server 118 and final authentication server 126 are the same server. In such an embodiment, the first authentication server 118 does not proxy the request.

Once the request has been processed, the first authentication server 118 receives an authentication reply from the final authentication server (126) 506. The final authentication server 126 may grant or deny access. For example, if the user supplies an invalid user identifier-password combination, the final authentication server 126 will deny access. The final authentication server 126 may request that the user resubmit the user identifier and password or provide some other indication as to why access was denied. The first authentication server 118 then sends the authentication reply to the access point (104) 508.

Figure 7:
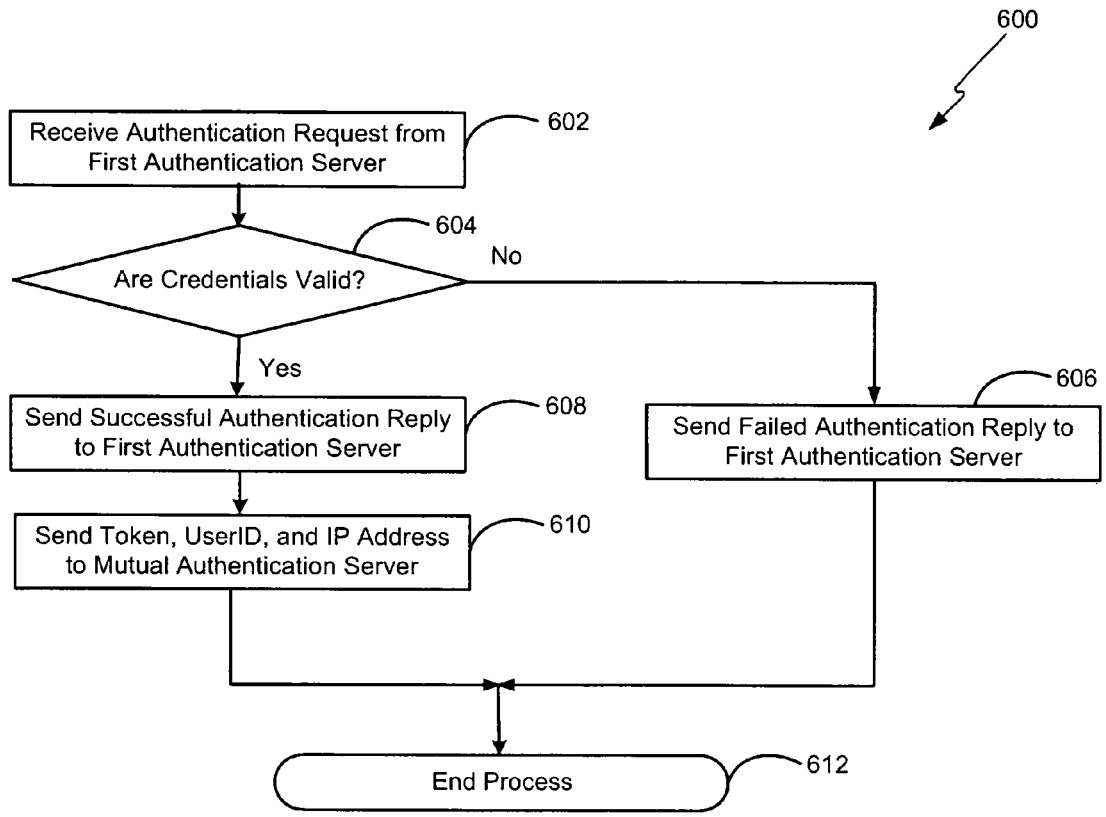
FIG. 7 is a flowchart illustrating a method for mutual authentication from a final authentication server perspective in one embodiment of the present invention.

FIG. 7 is a flowchart illustrating a method for mutual authentication from a final authentication server perspective in one embodiment of the present invention. In the process 600 shown in FIG. 7, the final authentication server 126 first receives an authentication request from the first authentication server (118) 602. The final authentication server (126) checks the credential to ensure that it is valid 604.

If the credential is invalid, the final authentication server 126 sends a failed authentication reply to the first authentication server (118) 606. After a failed authentication, the process ends 612. In one embodiment, after the final authentication server 126 sends a failed authentication reply, it requests that the user try again. If the user fails to log in successfully three consecutive times, it locks the user out.

If the credential is valid, the final authentication server 126 sends a successful authentication reply to the first authentication server (118) 608. The final authentication server 126 then sends the token, user id, and IP address to the mutual authentication server (134) 610. The process then ends 612.

Figure 8:
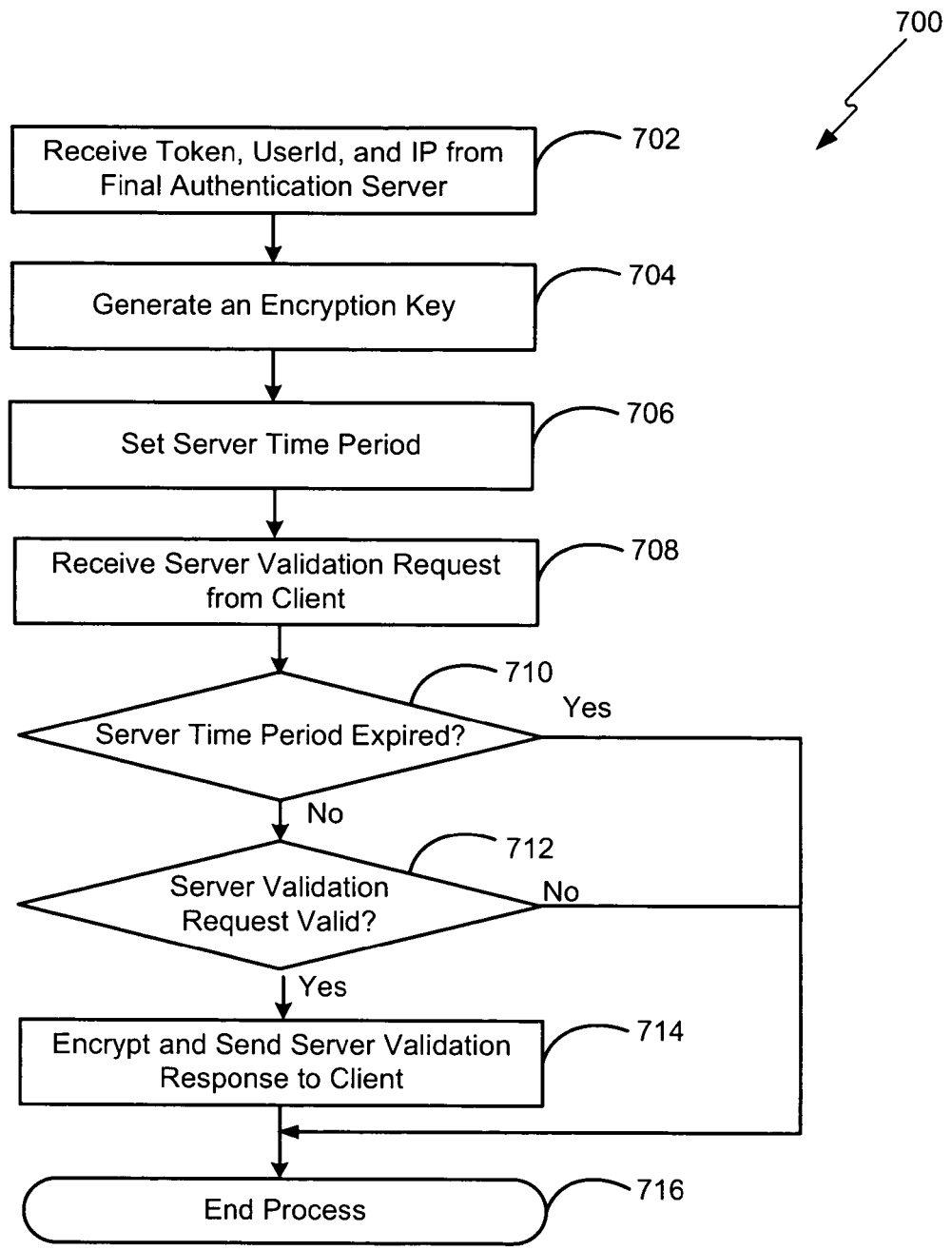
FIG. 8 is a flowchart illustrating a method for mutual authentication from a mutual authentication server perspective in one embodiment of the present invention.

FIG. 8 is a flowchart illustrating a method for mutual authentication from a mutual authentication server perspective in one embodiment of the present invention. In the process 700 shown, the mutual authentication server 134 receives a token, user ID, and IP address from the final authentication server (126) 702. The mutual authentication server uses this information to generate an encryption key 704. The encryption algorithm may be generated using a conventional encryption key generation algorithm. The mutual authentication server 134 then sets a server time period 706.

Subsequently, the mutual authentication server 134 receives a server validation request from the client (102) 708. The mutual authentication server 134 determines whether the server time period has expired 710. If the time period has expired, the process ends 716. Outside of the server time period, the mutual authentication server 134 does not respond to the server validation request.

If the time period has not expired, the mutual authentication server 134 determines whether the server validation request is valid 712. The mutual authentication server determines the validity of the request by attempting to decrypt it. In one embodiment, the mutual authentication server 134 locates or generates the appropriate encryption key. If the mutual authentication server 134 is unable to generate the key, the server validation request is ignored.

If the mutual authentication server 134 locates or determines the key, the mutual authentication server 134 attempts to decrypt the validation message. If the decryption is unsuccessful, the server validation request is ignored. If the decryption is successful, then the mutual authentication server 134 attempts to validate the request.

If the server validation request is invalid, the process ends 716. If the request is valid, the mutual authentication server 134 encrypts and sends a server validation response to the client 714. The mutual authentication server 134 utilizes the same encryption algorithm to encrypt the validation response as was used to decrypt the validation request. However, the encryption key is based on a second token. For example, the mutual authentication server 134 may use the next password from a one-time password list or may generate the next password using a password generation algorithm. The process then ends 716.

General

The foregoing description of the embodiments, including preferred embodiments, of the invention has been presented only for the purpose of illustration and description and is not intended to be exhaustive or to limit the invention to the precise forms disclosed. Numerous modifications and adap- That which is claimed:

1. A method comprising:
receiving, at an authentication server, a communication from a client, the communication having been sent wirelessly from the client to an access point and from the access point to the authentication server, the communication associated with a credential, the credential having a user identifier and a first token;
determining, at the authentication server, a second token associated with the user identifier, wherein the second token is independently stored on the client such that the second token is not transmitted between the client and authentication server but is available on both the client and the authentication server;
generating, at the authentication server, an encryption key based at least in part on the second token, wherein the encryption key is not transmitted between the client and authentication server but is available on both the client and authentication server since each can generate the encryption key using the second token;
receiving, at the authentication server, an authentication message from the client, wherein the authentication message was encrypted at the client using the encryption key, wherein the encryption key was generated at the client using the second token;
decrypting, at the authentication server, the authentication message using the encryption key, wherein the authentication message encrypted using the encryption key allows the authentication server to authenticate the client; and
transmitting, from the authentication server to the client, an authentication reply encrypted using the encryption key, wherein the authentication reply encrypted using the encryption key allows the client to authenticate the authentication server.

2. The method of claim 1, further comprising:
receiving a second communication encrypted using the encryption key from the client; and
decrypting the second communication using the encryption key.

3. A method comprising:
transmitting from a client a communication, the communication associated with a credential, the credential having a user identifier and a first token, wherein the communication is sent wirelessly via a first communication channel from the client to an access point and via a second communication channel from the access point to an authentication server;
determining, at the client, a second token associated with the user identifier, wherein the second token is independently stored on the client such that the second token is not transmitted between the client and authentication server but is available on both the client and the authentication server;
generating, at the client, an encryption key based at least in part on the second token, wherein the encryption key is not transmitted between the client and authentication server but is available on both the client and authentication server since each can generate the encryption key using the second token;
transmitting an authentication message from the client to the authentication server, wherein the authentication message was encrypted using the encryption key, wherein the authentication message encrypted using the encryption key allows the authentication server to authenticate the client;
receiving, at the client, from the authentication server an authentication response encrypted using the encryption key, wherein the encryption key on the authentication server was generated on the authentication server using the second token; and
decrypting, at the client, the authentication response using the encryption key, wherein the authentication response encrypted using the encryption key allows the client to authenticate the authentication server.

4. The method of claim 3, wherein the first communication channel comprises a wireless network channel and the second communication channel comprises a wired network channel.

5. The method of claim 3, further comprising
encrypting a second communication using the encryption key; and
transmitting the second communication.

6. The method of claim 3, wherein the authentication response further comprises a verification message associated with the access point.

7. The method of claim 6, further comprising determining whether the verification message is valid.

8. The method of claim 6, further comprising continuing communication if the verification message is valid.

9. The method of claim 6, further comprising discontinuing communication if the verification message is not valid.

10. A method comprising:
transmitting a communication from a client to an authentication server, the communication associated with a credential, the credential having a user identifier and a first token, wherein the communication is sent wirelessly from the client to an access point and from the access point to an authentication server;
receiving the communication at the authentication server;
determining a second token associated with the user identifier on the authentication server and on the client, wherein the second token is independently stored on the client such that the second token is not transmitted between the client and authentication server but is available on both the client and the authentication server;
generating an encryption key based at least in part on the second token on the authentication server and on the client, wherein the encryption key is not transmitted between the client and authentication server but is available on both the client and authentication server since each can generate the encryption key using the second token;
generating and encrypting an encrypted authentication request using the encryption key on the client;
transmitting the encrypted authentication request from the client to the authentication server;
receiving the encrypted authentication request on the authentication server;
decrypting the encrypted authentication request using the encryption key on the authentication server, wherein the authentication request encrypted using the encryption key allows the authentication server to authenticate the client;
generating and encrypting an encrypted authentication response using the encryption key on the authentication server; and
transmitting the encrypted authentication response to the client, wherein the authentication response encrypted using the encryption key allows the client to authenticate the authentication server.

11. A non-transitory computer-readable medium on which is encoded program code, the program code comprising:
- program code for receiving at an authentication server, a communication from a client, the communication having been sent wirelessly from the client to an access point and from the access point to the authentication server, the communication associated with a credential, the credential having a user identifier and a first token;
- program code for determining, at the authentication server, a second token associated with the user identifier, wherein the second token is independently stored on the client such that the second token is not transmitted between the client and authentication server but is available on both the client and the authentication server;
- program code for generating, at the authentication server, an encryption key based at least in part on the second token, wherein the encryption key is not transmitted between the client and authentication server but is available on both the client and authentication server since each can generate the encryption key using the second token;
- program code for receiving, at the authentication server, an authentication message from the client, wherein the authentication message was encrypted at the client using the encryption key, wherein the encryption key was generated on the client using the second token;
- program code for decrypting, at the authentication server, the authentication message using the encryption key, wherein the authentication message encrypted using the encryption key allows the authentication server to authenticate the client; and
- program code for transmitting, at the authentication server to the client, an authentication reply encrypted using the encryption key, wherein the authentication reply encrypted using the encryption key allows the client to authenticate the authentication server.

12. The computer-readable medium of claim 11, further comprising:
- program code for receiving at the authentication server a second communication encrypted using the encryption key from the client; and
- program code for decrypting the second communication using the encryption key.

13. A non-transitory computer-readable medium on which is encoded program code, the program code comprising:
- program code for transmitting from a client a communication, the communication associated with a credential, the credential having a user identifier and a first token, wherein the communication is sent wirelessly via a first communication channel from the client to an access point and via a second communication channel from the access point to an authentication server;
- program code for determining, at the client, a second token associated with the user identifier, wherein the second token is independently stored on the client such that the second token is not transmitted between the client and authentication server but is available on both the client and the authentication server;
- program code for generating, at the client, an encryption key based at least in part on the second token, wherein the encryption key is not transmitted between the client and authentication server but is available on both the client and authentication server since each can generate the encryption key using the second token;
- program code for transmitting an authentication message from the client to the authentication server, wherein the authentication message was encrypted using the encryption key, wherein the authentication message encrypted using the encryption key allows the authentication server to authenticate the client;
- program code for receiving, at the client, from the authentication server an authentication response encrypted using the encryption key, wherein the encryption key on the authentication server was generated on the authentication server using the second token; and
- program code for decrypting, at the client, the authentication response using the encryption key, wherein the authentication response encrypted using the encryption key allows the client to authenticate the authentication server.

14. The computer-readable medium of claim 13, further comprising
- program code for encrypting a second communication using the encryption key; and
- program code for transmitting the second communication.

15. The computer-readable medium of claim 13, wherein the authentication response further comprises a verification message associated with the access point, further comprising program code for determining whether the verification message is valid.

16. The computer-readable medium of claim 15, further comprising program code for continuing communication if the verification message is valid.

17. The computer-readable medium of claim 15, further comprising program code for discontinuing communication if the verification message is not valid.

18. A non-transitory computer-readable medium on which is encoded program code, the program code comprising:
- program code for transmitting a communication from a client to an authentication server, the communication associated with a credential, the credential having a user identifier and a first token, wherein the communication is sent wirelessly from the client to an access point and from the access point to an authentication server;
- program code for receiving the communication at the authentication server;
- program code for determining a second token associated with the user identifier on the authentication server and on the client, wherein the second token is independently stored on the client such that the second token is not transmitted between the client and authentication server but is available on both the client and the authentication server;
- program code for generating an encryption key based at least in part on the second token on the authentication server and on the client, wherein the encryption key is not transmitted between the client and authentication server but is available on both the client and authentication server since each can generate the encryption key using the second token;
- program code for generating and encrypting an encrypted authentication request using the encryption key on the client;
- program code for transmitting the encrypted authentication request from the client to the authentication server;
- program code for receiving the encrypted authentication request on the authentication server;
- program code for decrypting the encrypted authentication request using the encryption key on the authentication server, wherein the authentication request encrypted using the encryption key allows the authentication server to authenticate the client;

program code for generating and encrypting an encrypted authentication response using the encryption key on the authentication server; and program code for transmitting the encrypted authentication response to the client, wherein the authentication response encrypted using the encryption key allows the client to authenticate the authentication server.

19. A system comprising:

an authentication server operable to:

receive, at the authentication server, a communication from a client, the communication associated with a credential, the credential having a user identifier and a first token, wherein the communication is sent wirelessly from the client to an access point and from the access point to the authentication server;

determine a second token associated with the user identifier on the authentication server, wherein the second token is independently stored on the client such that the second token is not transmitted between the client and authentication server but is available on both the client and the authentication server;

generate an encryption key based at least in part on the second token on the authentication server, wherein the encryption key is not transmitted between the client and authentication server but is available on both the client and authentication server since each can generate the encryption key using the second token;

receive, at the authentication server, an authentication message from the client, wherein the authentication message was encrypted at the client using the encryption key, wherein the encryption key was generated on the client using the second token;

decrypt, at the authentication server, the authentication message using the encryption key, wherein the authentication message encrypted using the encryption key allows the authentication server to authenticate the client; and transmit, from the authentication server, an authentication reply encrypted using the encryption key to the client, wherein the authentication reply encrypted using the encryption key allows the client to authenticate the authentication server.

20. The system of claim 19, wherein the authentication server is further operable to:

receive a second communication encrypted using the encryption key from the client; and decrypt the second communication using the encryption key.

21. A system comprising:

a client device operable to:

transmit to an authentication server a communication, the communication associated with a credential, the credential having a user identifier and a first token, wherein the communication is sent wirelessly via a first communication channel from the client to an access point and via a second communication channel from the access point to an authentication server;

determine, at the client, a second token associated with the user identifier, wherein the second token is independently stored on the client such that the second token is not transmitted between the client and authentication server but is available on both the client and the authentication server;;

generate, at the client, an encryption key based at least in part on the second token, wherein the encryption key is not transmitted between the client and authentication server but is available on both the client and authentication server since each can generate the encryption key using the second token;

transmit an authentication message from the client to the authentication server, wherein the authentication message was encrypted using the encryption key, wherein the authentication message encrypted using the encryption key allows the authentication server to authenticate the client;

receive, at the client, from the authentication server an authentication response encrypted using the encryption key, wherein the encryption key on the authentication server was generated on the authentication server using the second token; and decrypt, at the client, the authentication response using the encryption key, wherein the authentication response encrypted using the encryption key allows the client to authenticate the authentication server.

22. The system of claim 21, wherein the client device is further operable to:

encrypt a second communication using the encryption key; and transmit the second communication.

23. The system of claim 21, wherein the authentication response further comprises a verification message associated with the access point.

24. The system of claim 23, wherein the client device is further operable to determine whether the verification message is valid.

25. The system of claim 23, wherein the client device is further operable to continue communication if the verification message is valid.

26. The system of claim 23, wherein the client device is further operable to discontinue communication if the verification message is not valid.

* * * * *